United States Patent [19]

Neubert

[11] Patent Number: 5,002,982

[45] Date of Patent: Mar. 26, 1991

[54] PAPER FELTS OR MATS

[75] Inventor: Terry C. Neubert, Kent, Ohio

[73] Assignee: GenCorp Inc., Fairlawn, Ohio

[21] Appl. No.: 484,601

[22] Filed: Feb. 26, 1990

[51] Int. Cl.$^5$ .................. C08L 51/06; C08F 267/02
[52] U.S. Cl. ..................... 523/407; 524/460; 162/158
[58] Field of Search ............... 523/407; 524/460

[56] References Cited

U.S. PATENT DOCUMENTS

| | | | |
|---|---|---|---|
| 3,193,446 | 7/1965 | Eisenberg | 162/145 |
| 3,338,858 | 8/1967 | Strasser et al. | 260/29.7 |
| 3,418,295 | 12/1968 | Schoenthaler | 260/80.72 |
| 3,448,089 | 6/1969 | Celeste | 260/78.5 |
| 3,497,380 | 2/1970 | Weber | 117/155 |
| 3,583,955 | 6/1971 | Holicky et al. | 260/78.4 |
| 3,660,525 | 5/1972 | Kawahara | 260/836 |
| 3,696,069 | 10/1972 | Schrage et al. | 260/41 R |
| 3,776,812 | 12/1973 | Jongetjes | 162/168 |
| 3,844,880 | 10/1974 | Meisel, Jr. et al. | 162/169 |
| 3,876,609 | 4/1975 | Schrage et al. | 260/42.18 |
| 3,890,282 | 6/1975 | Heilman | 260/78.5 |
| 4,002,586 | 1/1977 | Wessling et al. | 260/29.2 EP |
| 4,200,562 | 4/1980 | Yoshioka et al. | 260/29.6 |
| 4,225,383 | 9/1980 | McReynolds | 162/156 |
| 4,245,689 | 1/1981 | Grard et al. | 162/134 |
| 4,373,992 | 2/1983 | Bondoc | 162/145 |
| 4,412,017 | 10/1983 | Van Eenam | 523/408 |
| 4,740,555 | 4/1988 | Dean et al. | 525/67 |
| 4,761,463 | 8/1988 | Matsumoto et al. | 525/74 |
| 4,778,851 | 10/1988 | Henton et al. | 525/65 |
| 4,806,207 | 2/1989 | Monzon et al. | 162/168.1 |

FOREIGN PATENT DOCUMENTS

| | | | |
|---|---|---|---|
| 0089877 | 9/1983 | European Pat. Off. | 524/460 |
| 63-273617 | 11/1988 | Japan | 524/460 |
| 1-201312 | 8/1989 | Japan | 524/460 |

Primary Examiner—C. Warren Ivy

[57] ABSTRACT

A paper felt or mat is made from an aqueous slurry or dispersion of kraft wood pulp, a number of compounding ingredients such as finely divided inorganic pigments and fillers, a binder, an anionic latex of a copolymer wherein the core of the copolymer comprises a copolymer of a vinyl aryl monomer and a dicarboxylic acid monomer such as fumaric acid and/or itaconic acid and wherein the shell comprises a copolymer of a vinyl aryl monomer, a conjugated diene monomer, a glycidyl monomer such as glycidyl acrylate and/or glycidyl methacrylate and optionally a monocarboxylic acid monomer such as acrylic acid and/or methacrylic acid. The mat of this invention exhibits improved properties over mats made from other latex binders.

6 Claims, No Drawings

PAPER FELTS OR MATS

This invention relates to a polymeric binder, to a method for making said binder and to felts or paper mats.

BACKGROUND

Paper felts or mats are formed from an aqueous slurry of kraft wood pulp, a predominant amount of finely divided inorganic fillers, a latex binder and other ingredients such as antioxidants, biocides and flocculants. The slurry is cast onto a fourdrinier machine or rotary drum machine from a head box where the water is largely removed, pressed to form a sheet which is then passed over drying cans, cooling cans, calendered and wound on a reel.

To form a flooring tile, the felt or mat is unwound from the reel, passed to a conveyor where the top layer of the mat is coated with a vinyl plastisol which is fluxed and cooled to form a vinyl coating which is then printed to form a design on the vinyl coating of the mat sheet. The design is then overcoated with a hot melt vinyl coating composition and cooled to form an abrasion-resistant top coating.

An object of this invention is to provide a novel polymeric binder for paper felts or mats.

Another object of this invention is to provide a method for making a novel polymeric binder.

Still another object of this invention to provide an improved paper felt or mat.

These and other objects and advantages of the present invention will become more apparent to those skilled in the art from the following description and examples.

SUMMARY OF THE INVENTION

According to the present invention, an improved paper felt or mat is provided wherein the latex or polymeric binder used in the paper making process comprises an anionic emulsion of a polymeric binder comprising a core-shell copolymer wherein the core comprises a copolymer of a vinyl aryl monomer and fumaric and/or itaconic acid and a shell of a copolymer of a vinyl aryl monomer, a conjugated diene, glycidylacrylate and/or glycidylmethacrylate and optionally acrylic acid and/or methacrylic acid.

The core-shell copolymer latex is then mixed with the kraft wood pulp and compounding ingredients for the paper felt or mat, dewatered, dried and compressed to form a paper felt or mat.

DISCUSSION OF DETAILS AND PREFERRED EMBODIMENTS

In the core the vinyl aryl monomer having from 8 to 10 carbon atoms may be selected from the group consisting of styrene, alphamethyl styrene, paramethyl styrene, methylvinyl toluene, p-vinyl toluene and s-ethyl styrene. Styrene is preferred. The styrene is used in an amount of from 6 to 8 parts by weight and the fumaric and/or itaconic acid are used in an amount of from 1 to 8 parts. Fumaric acid is preferred.

In the shell, the conjugated diene monomer has from 4 to 6 carbon atoms selected from the group consisting of butadiene-1,3 (preferred), isoprene, piperylene, 2,3-dimethyl-1,3-butadiene, pentadiene and hexadiene and where the vinyl aryl monomer has from 8 to 10 carbon atoms and can be selected from the group consisting of styrene (preferred), alphamethyl styrene, paramethyl styrene, methylvinyl toluene, p-vinyl toluene and 3-ethyl styrene. The vinyl aryl monomer is used in an amount of from about 40 to 60 parts by weight and the conjugated diene monomer is used in an amount of from 60 to 40 parts. The glycidyl acrylate and/or glycidyl methacrylate (preferred) is used in an amount of from 1.5 to 5.0 parts. The acrylic and/or methacrylic acid (if used, it is preferred) are employed in an amount of 0 to 2.0 parts.

The copolymer core is first formed by free radical emulsion polymerization, followed by the addition of monomers to form the shell copolymer.

Of the core-shell copolymer, the core comprises about 7.5 to 10.5 parts and the shell comprises from 92.5 to 89.5 parts.

Polymerization of the monomers to form the core and shell is effected by free-radical initiators (free-radical formers or free-radical forming systems, catalysts) such as ammonium, potassium or sodium persulfate, $H_2O$ and the like in an amount sufficient for polymerization of the monomers and to obtain the desired molecular weight. Other free-radical initiators can be used which decompose or become active at the temperature used during polymerization. Examples of some other free-radical initiators are cumene hydroperoxide, dibenzoyl peroxide, diacetyl peroxide, didecanoyl peroxide, di-t-butyl peroxide, dilauroyl peroxide, bis (p-methoxy benzoyl) peroxide, t-butyl peroxy pivalate, dicumyl peroxide, isopropyl percarbonate, di-sec-butyl, peroxydicarbonate, azobis-dimethyl-valeronitrile, 2,2'-azobisisobutyronitrile, 2,2'-azobis-2-methylbutyronitrile and 2,2'-azobis (methylisobutyrate) and the like and mixtures of the same. Only minor amounts of initiators are necessary to effect polymerization.

Emulsifiers such as soaps, surfactants or dispersing agents are used in an amount sufficient to obtain an aqueous emulsion of the water and monomers and resulting polymers. Examples of some emulsifiers are potassium laurate, potassium soap of disproportionated rosin, potassium stearate, potassium oleate, sodium lauryl sulfate, na-dodecyldiphenyloxide disulfonate, di-iso butylsodiumsulfosuccinate, sodium dodecylsulfonate, sodiumdecylsulfate, sodium salt of condensed naphthalene sulfonic acid and sodium rosinate and the like and mixtures thereof. Other well know surfactants can be used.

Chain transfer agents or modifiers are well known in the emulsion copolymerization of vinyl and diene monomers to make polymers. They are used generally to modify the molecular weight and to reduce cross-linking. While many types have been proposed, it is preferred to use the alkyl and/or alkylaryl mercaptans having from 8 to 18 carbon atoms. Of these, the tertiary alkyl mercaptans are much preferred. Examples of some mercaptans are n-octyl mercaptan, n-dodecyl mercaptan (preferred), t-octyl mercaptan, t-dodecyl mercaptan, p-tridecyl mercaptan, tetradecyl mercaptan, hexadecyl mercaptan and so forth and the mixtures thereof.

NaOH, KOH, $NH_4OH$ and so forth may be added to the polymerization reactor before, during or after polymerization to control the pH as desired.

The water should be free of deleterious materials, and preferably should be distilled or ion exchanged. Sufficient water is used to enable formation of the emulsions and to enable proper mixing or stirring of the ingredients during polymerization to obtain the desired rate and degree of polymerization, heat transfer and so forth. The solids content of the resulting aqueous alkaline latices or dispersions or copolyers may vary from about 35 to 55% by weight, and the pH can be from about 7.0 to 11.5.

Stabilizers, antioxidants and chelating agents may be used during polymerization Also the use of shortstops at the end of free radical polymerization is well known; they are not only used to stop the polymerization in the reactor at the desired conversion but also to prevent further polymerization, cross-linking, etc. during stripping, work-up and so forth. Examples of some shortstops are hydroquinone, sodium sulfide, hydroxyl ammonium acid sulfate, hydroxyl ammonium sulfate, sodium diethyl dithiocarbamate, diethylhydroxylamine (preferred), sodium dimethyl dithiocarbamate, potassium dimethyl dithiocarbamate, dimethylammonium dimethyldithiocarbamate, hydroxylamine sulfate plus sodium hydrosulfite and so forth.

Temperatures used during polymerization should be sufficient to effect polymerization by activation of the initiator and double bonds of the monomers. They should not be too high to cause a run-away reaction and not too low to retard polymerization. In general, the temperature may be from about 125° to 175° F.

Polymerization should be conducted in a pressure reactor, fitted with a stirrer or other agitating means, heating and cooling means, with means to flush with or pump in an inert gas such as nitrogen, helium, argon, neon and the like in order to polymerize preferably under inert or non-reactive conditions, with means to charge the monomers, water, initiators and so forth, venting means, and with means to recover the polymer and so forth. The reactor should be cleaned or flushed out between polymerization runs to remove traces of shortstops, initiators, modifier, residues and so forth which might interfere with subsequent polymerizations. There should be sufficient agitation or stirring of the polymerization media to ensure thorough mixing, diffusion, contact and so forth. All of the polymerization ingredients except the shortstop may be charged to the reactor at the same time, intermittently, incrementally or continuously. Also, the ingredients may be added separately or in a mixture.

The polymers are, thus, made in water using free radical initiators, chelating agents, modifiers, emulsifiers, surfactants, stabilizers, fungicides, short stopping agents and so forth by known techniques. Polymerization may be carried to about 100% conversion.

On a dry weight basis the aqueous slurry to form the paper felt or mat comprises from about parts by weight:
Kraft wood pulp 5.0 to 20.0
Polyethylene particles 0.5 to 3.0 to improve pulping
Finely divided clay 60.0 to 85.0 or talc (clay preferred)
Glass fibers, chopped 1.0 to 2.0 inches
Antioxidant 0.01 to 0.0015
Water clarifier 0.01 to 0.02
Latex copolymer 8.0 to 16.0
Surfactants, fungicides and defoamers also may be added to the slurry.

The following examples will serve to illustrate the invention with more particularity to those skilled in the art.

EXAMPLE 1

A. Preparation of core or seed copolymer:

| Charge Instructions | Charge Order | Material | Parts |
|---|---|---|---|
| Initial charge heat to 135° F. | | Deionized water | 89.25 |
| | | Hampene Na 3 (40%) | 0.05 |
| | 1 | Dowfax 2A1 (15%) | 0.195 |
| | | Monawet MB45 (45%) | 2.25 |
| | | Fumaric Acid | 0.75 |
| | | Potassium Persulfate | 0.30 |
| React for 45 min. @ 135° F. then charge | 2 | Styrene | 7.50 |

B. Preparation of over copolymer or shell copolymer:

| Charge Instruction | Charge Order | Material | Parts |
|---|---|---|---|
| React 75 min. then charge | | Styrene | 7.33 |
| | 3 | Sulfole 120 | 0.06 |
| | 4 | Butadiene | 7.58 |
| Charge @ 16 ± 1 T.S.C. | | Styrene | 7.33 |
| | 5 | Sulfole 120 | 0.06 |
| Raise temp to 160° F. | | Butadiene | 7.58 |
| | 6 | Glycidyl Methacrylate | 0.38 |
| | 7 | Deionized Water | 2.00 |
| Charge @ 22% ± 1 T.S.C. | 8 | Styrene | 7.33 |
| | | Sulfole 120 | 0.06 |
| | | Butadiene | 7.58 |
| | 9 | GMA | 0.38 |
| | 10 | Deionized Water | 2.00 |
| Charge @ 27% ± 1 T.S.C. | | Styrene | 7.33 |
| | | Sulfole 120 | 0.06 |
| | 11 | Methacrylic Acid | 0.75 |
| | | Butadiene | 7.58 |
| Charge @ 32% ± 1 T.S.C. | | Styrene | 7.33 |
| | 12 | Sulfole 120 | 0.06 |
| | | Butadiene | 7.58 |
| | 13 | GMA | 0.38 |
| | 14 | Deionized Water | 2.00 |
| Charge @ 35% ± 1 T.S.C. | | Styrene | 7.33 |
| | 15 | Sulfole 120 | 0.06 |
| | | Butadiene | 7.58 |
| | 16 | GMA | 0.38 |
| | 17 | Deionized Water | 2.00 |
| Charge @ 37% ± 1 | 18 | Deionized Water | 2.74 |
| | | Potassium Persulfate | 0.10 |
| | | Deionized Water | 3.62 |
| | 19 | Drew L-198 | 0.15 |
| | | DEHA (85%) | 0.20 |

PHYSICAL PROPERTIES

| | Blowover | Stripped |
|---|---|---|
| % TSC | 46.19 | 38.5 |
| pH | 3.01 | 353 |
| S.T. | 50.6 | 446 |
| B.V. | 69.0 | 20 |
| % Turb. | 58 | 57 |
| Prefloc | 1.9% | |
| Filterability | good | |

| Totals: | Core | 8.21 parts |
|---|---|---|
| | Shell | 91.75 parts |
| | Bd | 45.48 parts |
| | Sty | 51.48 parts |
| | GMA | 1.52 parts |
| | MAA | .75 |
| | FA | .75 |

EXAMPLE 2

A. Preparation or core or seed copolymer:

| Charge Instruction | Charge Order | Material | Parts |
|---|---|---|---|
| Initial charge heat to 135° F. | | Deionized water | 89.25 |
| | | Hampene Na 3 (40%) | 0.05 |
| | 1 | Dowfax 2Al (15%) | 0.195 |
| | | Monawet MB45 (45%) | 2.25 |
| | | Fumaric Acid | 0.75 |
| | | Potassium Persulfate | 0.30 |
| React for 45 min.@ | 2 | Styrene | 7.50 |

-continued

| 135° F. then charge | | | |
|---|---|---|---|
| B. Preparation of coverpolymer or shell copolymer: | | | |
| Charge Instruction | Charge Order | Material | Parts |
| React 75 min. then charge | | Styrene | 7.2 |
|  | 3 | Sulfole 120 | 0.06 |
|  | 4 | Butadiene | 7.47 |
| Charge @ 1h% ± 1 T.S.C. | | Styrene | 7.2 |
|  | 5 | Sulfole 120 | 0.06 |
| Raise temp to 160° F. | | Butadiene | 7.47 |
|  | 6 | Glycidyl Methacrylate | 0.75 |
|  | 7 | Deionized Water | 2.00 |
| Charge @ 22% ± 1 T.S.C. | | Styrene | 7.2 |
|  | 8 | Sulfole 120 | 0.06 |
|  |  | Butadiene | 7.47 |
|  | 9 | GMA | 0.75 |
|  | 10 | Deionized Water | 2.00 |
| Charge @ 27% ± 1 T.S.C. | | Styrene | 7.2 |
|  |  | Sulfole 120 | 0.06 |
|  | 11 | Methacrylic Acid | 0.75 |
|  |  | Butadiene | 7.47 |
| Charge @ 32% ± 1 T.S.C. | | Styrene | 7.2 |
|  | 12 | Sulfole 120 | 0.06 |
|  |  | Butadiene | 7.47 |
|  | 13 | GMA | 0.75 |
|  | 14 | Deionized Water | 2.00 |
| Charge @ 35% ± 1 T.S.C. | | Styrene | 7.2 |
|  | 15 | Sulfole 120 | 0.06 |
|  |  | Butadiene | 7.47 |
|  | 16 | GMA | 0.75 |
|  | 17 | Deionized Water | 2.00 |
| Charge @ 37% ± 1 | 18 | Deionized Water | 2.74 |
|  |  | Potassium Persulfate | 0.10 |
| React to 47-49% T.S.C. then add post | | | |
|  |  | Deionized Water | 3.62 |
|  | 19 | Drew L-198 | 0.15 |
|  |  | DEHA (85%) | 0.20 |

| PHYSICAL PROPERTIES | | |
|---|---|---|
|  | Blowover | Stripped |
| % TSC | 46.61 | 53.0 |
| pH | 3.71 | 3.45 |
| S.T. | 47.1 | 47.2 |
| B.V. | 59 | 159 |
| % Turb. | 54 | 51 |
| Prefloc | 3.1% |  |
| Filterability | good |  |

| Totals: | Core | 8.25 parts |
|---|---|---|
|  | Shell | 91.75 parts |
|  | Bd | 44.82 parts |
|  | Sty | 50.70 parts |
|  | GMA | 3.00 parts |
|  | MAA | .75 |
|  | FA | .75 |

EXAMPLE 3

| A. Preparation of core or seed copolymer: | | | |
|---|---|---|---|
| Charge Instruction | Charge Order | Material | Parts |
| Initial charge heat to 135° F. | | Deionized water | 89.25 |
|  |  | Hampene Na3 (40%) | 0.05 |
|  | 1 | Dowfax 2A1 (15%) | 0.195 |
|  |  | Monawet MB45 (45%) | 2.25 |
|  |  | Fumaric Acid | 1.50 |
|  |  | Potassium Persulfate | 0.30 |
| React for 45 min. @ 135° F. then charge | 2 | Styrene | 7.50 |

| B. Preparation of over copolymer or shell copolymers: | | | |
|---|---|---|---|
| Charge Instruction | Charge Order | Material | Parts |
| React 75 min. then charge | | Styrene | 7.2 |
|  | 3 | Sulfole 120 | 0.06 |
|  | 4 | Butadiene | 7.47 |
| Charge @ 27% ± 1 | | Styrene | 7.2 |

| | | | |
|---|---|---|---|
| T.S.C. | 5 | Sulfole 120 | 0.06 |
| Raise temp to 160° F. | | Butadiene | 7.47 |
|  | 6 | Glycidyl Methacrylate | 0.75 |
|  | 7 | Deionized Water | 2.00 |
| Charge @ 22% ± 1 T.S.C. | | Styrene | 7.2 |
|  | 8 | Sulfole 120 | 0.06 |
|  |  | Butadiene | 7.47 |
|  | 9 | GMA | 0.75 |
|  | 10 | Deionized Water | 2.00 |
| Charge @ 27% ± 1 T.S.C. | | Styrene | 7.2 |
|  | 11 | Sulfole 120 | 0.06 |
|  |  | Butadiene | 7.47 |
| Charge @ 32% ± 1 T.S.C. | | Styrene | 7.2 |
|  | 12 | Sulfole 120 | 0.06 |
|  |  | Butadiene | 7.47 |
|  | 13 | GMA | 0.75 |
|  | 14 | Deionized Water | 2.00 |
| Charge @ 35% ± 1 T.S.C. | | Styrene | 7.2 |
|  | 15 | Sulfole 120 | 0.06 |
|  |  | Butadiene | 7.47 |
|  | 16 | GMA | 0.75 |
|  | 17 | Deionized Water | 2.00 |
| Charge @ 37% ± 1 T.S.C. | 18 | Deionized Water | 2.74 |
|  |  | Potassium Persulfate | 0.10 |
| React to 47-49% T.S.C. then add post | | | |
|  |  | Deionized Water | 3.62 |
|  | 19 | Drew L-198 | 0.15 |
|  |  | DEHA (85%) | 0.20 |

| PHYSICAL PROPERTIES | | |
|---|---|---|
|  | Blowover | Stripped |
| % TSC | 47.16 | 52.0 |
| pH | 3.19 | 3.26 |
| S.T. | 43.8 | 43.7 |
| B.V. | 72.5 | 121 |
| % Turb. | 53 | 55 |
| Prefloc | 15.7% |  |
| Filterability | good |  |

| Totals: | Core | 9.00 parts |
|---|---|---|
|  | Shell | 91.02 parts |
|  | Bd | 44.82 parts |
|  | Sty | 50.70 parts |
|  | GMA | 3.00 parts |
|  | FA | 1.50 |

EXAMPLE 4

| A. Preparation of core of seed copolymer: | | | |
|---|---|---|---|
| Charge Instruction | Charge Order | Material | Parts |
| Charge to reactor Set agitation to 250 RPM, purge well | 1 | Deionized water | 73.419 |
|  |  | Itaconic Acid | 0.05 |
|  |  | Hampene Na3 (40%) | 0.05 |
|  |  | Potassium Persulfate | 0.25 |
|  |  | Dowfax 2A1 (15%) | 0.14 |
|  |  | Monawet MB45 (45%) | 0.50 |
|  |  | Di Sodium Phosphate | 0.50 |
| Heat reactor to 135° F. then pull full vacuum and charge | 2 | Styrene | 7.50 |

| B. Preparation of over copolymer or shell copolymer: | | | |
|---|---|---|---|
| Charge Instruction | Charge Order | Material | Parts |
| React 90 min., take TSC sample and charge Raise temp. to 170° F. | | Styrene | 6.667 |
|  | 3 | Sulfole 120 | 0.09 |
|  |  | Butadiene | 8.083 |
|  |  | Deionized Water | 5.328 |
| React 65 min. Take sample for % T.S.C., then charge | 4 | Dowfax 2A1 (15%) | 0.20 |
|  |  | Sodium Hydroxide (50%) | 0.05 |
|  |  | Styrene | 6.667 |
|  |  | Sulfole 120 | 0.09 |
|  | 5 | Glycidyl Methacrylate | 1.50 |
|  |  | Butadiene | 8.083 |
|  | 6 | Deionized Water | 4.426 |

-continued

| | | | |
|---|---|---|---|
| React 62 min. then take sample for % T.S.C. and charge | 7 | Dowfax 2Al (15%)<br>Styrene<br>Sulfole 120<br>Butadiene | 0.10<br>6.667<br>0.09<br>8.083 |
| | 8 | Deionized Water<br>Dowfax 2Al (15%) | 2.566<br>0.10 |
| React 65 min. then take sample for % T.S.C. and charge | 9 | Styrene<br>Sulfole 120<br>Methacrylic Acid<br>Butadiene | 6.667<br>0.09<br>0.50<br>8.083 |
| | 10 | Deionized Water<br>Dowfax 2Al (15%) | 4.71<br>0.15 |
| React 66 min. then take sample for % T.S.C. and charge | 11 | Styrene<br>Sulfole 120<br>Glycidyl Methacrylate<br>Butadiene | 6.667<br>0.09<br>1.50<br>8.083 |
| | 12 | Deionized Water<br>Dowfax 2Al (15%)<br>Sulfole 120 | 4.993<br>0.20<br>0.09 |
| React 65 min. then take sample for % T.S.C. and charge | 13 | Butadiene | 8.083 |
| React 90 min., take T.S.C sample and charge | 14 | Deionized Water<br>Potassium Persulfate<br>Deionized Water | 4.74<br>0.10<br>0.113 |
| React 2 hrs, then charge and mix 15 min. Cool to room temp. and add DEHA filter and run B/O prop. | 15 | Sodium Hydroxide (50%)<br>Dowfax 2Al (15%)<br>Drew L-198 | 0.39<br>0.35<br>0.15 |
| | 16 | Deionized Water<br>DEHA (85%) | 2.17<br>0.20 |
| Rotovac 1 qt @ 150°-160° F. then cool and add post filter and run stripped properties | 17 | Deionized Water<br>Proxel GXL (25%) | 0.575<br>0.05 |

Batch charged and followed to complete in 10.7 hours

PHYSICAL PROPERTIES

| | Blowover | Stripped |
|---|---|---|
| % TSC | 43.14 | 42.96 |
| pH | 8.48 | 8.38 |
| S.T. | 47.6 | 47.6 |
| B.V. | 18.5 | 20 |
| % Turb. | 48 | 48 |
| Prefloc | .24% | |
| Filterability | very good | |

| Totals: | Core | 8.00 parts |
|---|---|---|
| | Shell | 92.00 Parts |
| | | 100.00 |
| | Butadiene | 48.498 parts |
| | Styrene | 47.502 parts |
| | Itaconic acid | 0.50 parts |
| | Glycidyl Methacrylate | 3.00 parts |
| | Methacrylic acid | .50 parts |
| | | 100.00 |

For examples 1 to 4, conversions to monomers to polymers were about 98 to 100%. After stripping, total solids were about 38 to 53%.

Notes for Examples 1 to 4:

Hampene Na3-Ethylenediaminetatraacetic acid-sodium salt, sequestrant or chelating agent.
Dowfax 2A1-Na-dodecyldipheylacid-disulfonate.
Monawet MB45-Di-isobutylsodiumsulfosuccinate.
Sulfole 120-T-dodecyl mercaptan, Phillips Petroleum Co.
Drew L-198-Defoamer, Drew Chemical Co.
DEHA-Diethylhydroxylamine, Shortstop.
PROXEL GXL-Fungicide/bactericide, ICI Americas (1-2-benzisothiazolin-3-one).
Bd-Butadiene.
Sty-Styrene.
GMA-Glycidyl methacrylate.
MAA-Methacrylic acid.
FA-Fumaric acid.
IA-Itaconic acid.

T.S.C. OR TSC-TOTAL SOLIDS CONTENT

EXAMPLE 5

Aqueous slurries were prepared from, on a dry parts-by-weight basis:

| | |
|---|---|
| Kraft wood pulp | 13.0 |
| Compounding ingredients | |
| Pulpex P, Grade A-DC polyethylene particles | 1.00 |
| NARVIN F-3 clay | 15.70 |
| Afton clay | 36.60 |
| Dicalite (not clay) | 18.00 |
| Glass fibers | 1.50 |
| Antioxidant | 0.1 |
| Water clarifier, KYMENE | 0.0125 |
| Latexes | |
| Latex copolymer (various) | 14.0 |

The slurries containing also a fungicide were flocculated with a cationic flocculant and then cast onto wire screens to remove the water to form sheets which were compressed, heated, and cooled to form felts or mats which were then tested.

The anionic core-shell compolymer binder latices used were the following copolymers (parts by weight of monomers):

| |
|---|
| I. Control: |
| 45.5 Butadiene |
| 51.5 Styrene |
| .5 Itaconic acid |
| .5 Methacrylic acid |
| 3.0 Acrylamide |
| II. Latex of the Invention: |
| 51.5 Styrene |
| 45.5 Butadiene |
| .75 Fumaric acid |
| .75 Methacrylic acid |
| 1.50 Glycidyl methacrylate |
| III. Latex of the Invention: |
| 50.3 Styrene |
| 44.45 Butadiene |
| .75 Fumaric acid |
| 1.50 Methacrylic acid |
| 3.00 Glycidyl methacrylate |
| IV. Latex of the Invention: |
| 50.7 Styrene |
| 44.8 Butadiene |
| 1.5 Fumaric acid |
| 3.0 Glycidyl methacrylate |
| V. Latex of the Invention: |
| 51.5 Styrene |
| 45.5 Butadiene |
| 1.5 Fumaric acid |
| 1.5 Glycidyl methacrylate |

TABLE A

Tests on Paper Felts or Mats

| Latex Binder | Wt in Gms | Slurry °C. | pH | Flocculant Wt in Gms 1st | 2nd | CSF CC | Williams Freeness Sec | Drain Time Sec |
|---|---|---|---|---|---|---|---|---|
| I | 30.91 | 37.0 | 6.89 | 199 | 27 | 540 | 37 | 1.58 |
| II | 36.36 | 39.2 | 7.23 | 179 | 33 | 550 | 28 | 1.68 |
| III | 33.67 | 38.4 | 7.22 | 205 | 42 | 580 | 28 | 1.53 |
| IV | 26.92 | 38.5 | 7.17 | 229 | 30 | 630 | 18 | 1.45 |
| V | 30.46 | 39.9 | 7.00 | 163 | 30 | 520 | 32 | 1.75 |
| | | | | | | | Hot | Hot |

TABLE A-continued

Tests on Paper Felts or Mats

| Latex Binder | Sheet Wt | Thickness Inches | Density Lbs/Ft³ | Tensile Lbs | Tensile Elong % |
|---|---|---|---|---|---|
| I | 22.94 | 0279 | 48.67 | 13.36 | 2.37 |
| II | 24.82 | 0299 | 49.29 | 16.47 | 2.97 |
| III | 24.91 | 0289 | 50.97 | 17.81 | 3.44 |
| IV | 25.07 | 0271 | 50.17 | 16.73 | 3.12 |
| V | 22.34 | 0281 | 48.51 | 13.38 | 2.60 |

| Latex Binder | Cold Tensile Lbs | Cold Tensile Elong % | Split Strength Lb Max | Split Strength Lb Mean | Heat Aging Sec |
|---|---|---|---|---|---|
| I | 21.06 | 2.42 | 35 | 45 | 109 |
| II | 25.46 | 3.87 | 41 | 50 | 102 |
| III | 30.96 | 4.49 | 50 | 65 | 76 |
| IV | 23.72 | 3.60 | 41 | 53 | 300 |
| V | 26.20 | 3.86 | 49 | 41 | 74 |

Other tests on felts using polymeric latices made with glycidyl methacrylate on a co-monomer in the shell of the core-shell copolymer showed heat aging time of 276, 310, 492 and 504 seconds, respectively. These results show unusually high heat aging for latices containing glycidyl methacrylate as compared to a control latex. Also, the latices containing glycidyl methacrylate gave felts with higher cold tensile strengths than the control.

What is claimed is:

1. The method comprising the aqueous, anionic, free-radical emulsion copolymerizations in A and B to form a latex comprising:

A. copolymerizing from about 6 to 8 parts of at least one vinyl aryl monomer having from 8 to 10 carbon atoms and from 1 to 3 parts of at least one monomer selected from the group consisting of fumaric acid and itaconic acid to form a core and then B. copolymerizing on said core from about 40 to 60 parts of at least one vinyl aryl monomer having from 8 to 10 carbon atoms, from 60 to 40 parts of at least one conjugated diene monomer having from 4 to 6 carbon atoms, from 1.5 to 5.0 parts of at least one glycidyl monomer selected from the group consisting of glycidyl acrylate and glycidyl methacrylate and from 0 to 2.0 parts of at least one monocarboxylic acid, selected from the group consisting of acrylic acid and methacrylic acid to form a shell on said core wherein the polymer composition of the core comprises from about 7.5 to 10.5 parts and where the shell comprises from about 92.5 to 89.5 parts, all parts of monomers adding up to about 100 parts.

2. The method according to claim 1 where the vinyl aryl monomer is selected from the group consisting of styrene, alphamethyl styrene, paramethyl styrene, methyl vinyl toluene, p-vinyl toluene and 3-ethyl styrene and where said conjugated diene monomer is selected from the group consisting of butadiene-1,3 isoprene, piperylene, 2,3-dimethyl-1,3-butadiene, pentadiene and hexadiene.

3. The method according to claim 2 where said vinyl aryl monomer is styrene, said conjugated diene is butadiene-1,3, where said dicarboxylic acid is fumaric acid, where said monocarboxylic acid is methacrylic acid and where said glycidyl monomer is glycidyl methacrylate.

4. The latex produced by the method of claim 1.

5. The latex produced by the method of claim 2.

6. The latex produced by the method of claim 3.

* * * * *